United States Patent

Rallison et al.

[11] Patent Number: 5,945,967
[45] Date of Patent: *Aug. 31, 1999

[54] SPECKLE DEPIXELATOR

[75] Inventors: Richard Dennis Rallison, Paradise, Utah; Robert N. McRuer, Seattle, Wash.

[73] Assignee: i-O Display Systems, LLC, Menlo Park, Calif.

[*] Notice: This patent issued on a continued prosecution application filed under 37 CFR 1.53(d), and is subject to the twenty year patent term provisions of 35 U.S.C. 154(a)(2).

[21] Appl. No.: 08/416,909
[22] PCT Filed: Jan. 18, 1995
[86] PCT No.: PCT/US95/00661
  § 371 Date: Apr. 21, 1995
  § 102(e) Date: Apr. 21, 1995
[87] PCT Pub. No.: WO96/22590
  PCT Pub. Date: Jul. 25, 1996
[51] Int. Cl.$^6$ .................................................. G09G 3/36
[52] U.S. Cl. .............................................. 345/32; 359/569
[58] Field of Search ................................. 345/32, 33, 36; 359/569, 619, 640

[56] References Cited

U.S. PATENT DOCUMENTS

| | | | |
|---|---|---|---|
| 5,320,538 | 6/1994 | Baum | 434/307 |
| 5,442,482 | 8/1995 | Johnson et al. | 359/619 |
| 5,602,679 | 2/1997 | Dolgoff et al. | 359/640 |

*Primary Examiner*—Mark R. Powell
*Attorney, Agent, or Firm*—Sheridan Ross P.C.

[57] ABSTRACT

A depixelator for improving the image generated by a pixelated image generator, using a non-periodic optic element, is provided. By providing a non-periodic optic element, artifacts such as moire patterns generated by periodic devices such as crossed-gratings, can be reduced or eliminated. The optic device preferably includes a plurality of randomly spaced and/or sized dimples or specks for diffracting a substantial portion of light from pixels into interpixel regions, with the depth of the specks preferably smoothly varying across the surface.

17 Claims, 4 Drawing Sheets

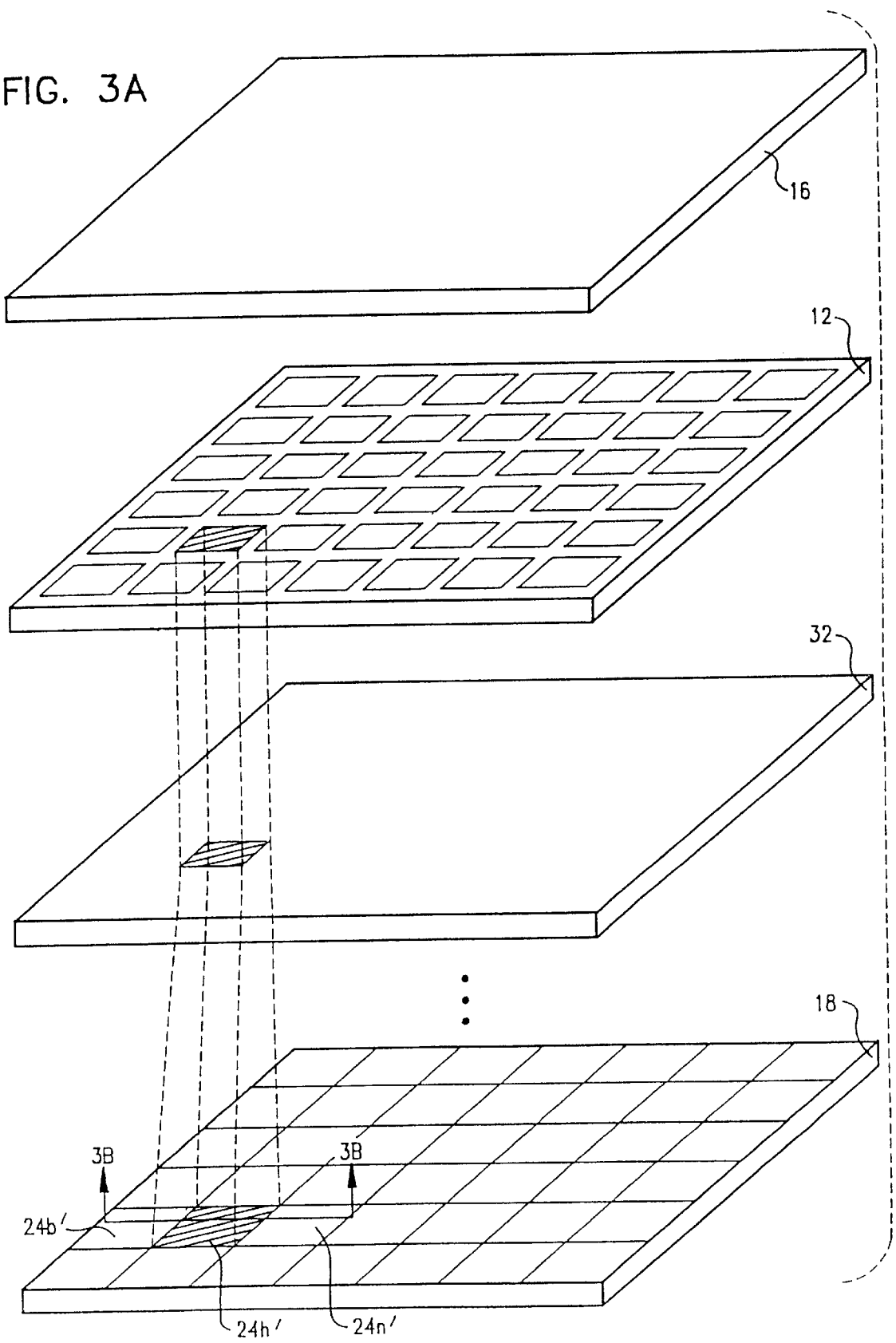

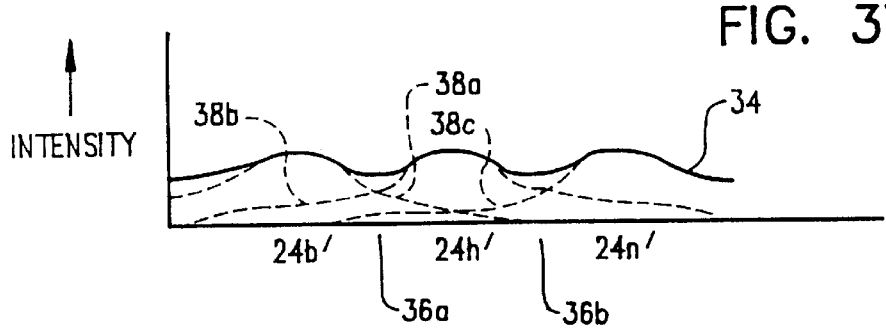
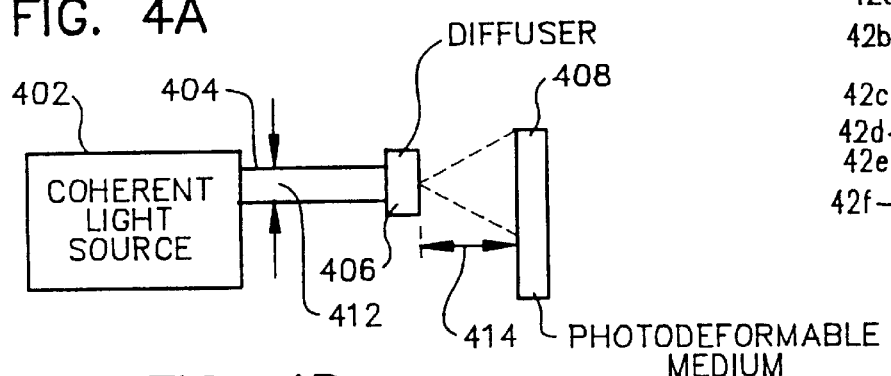
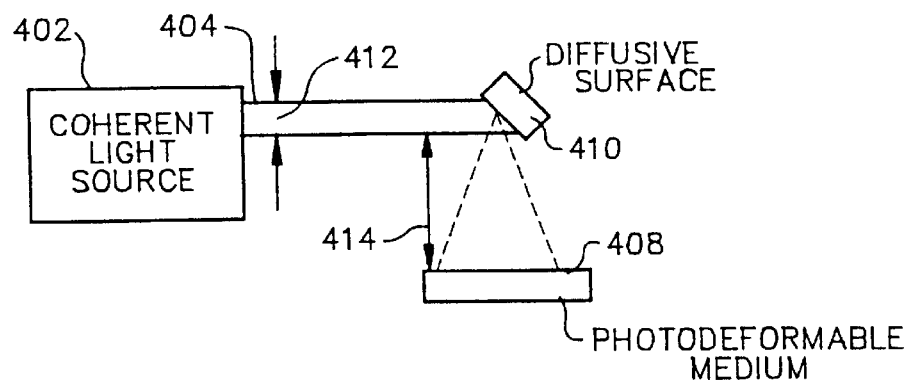
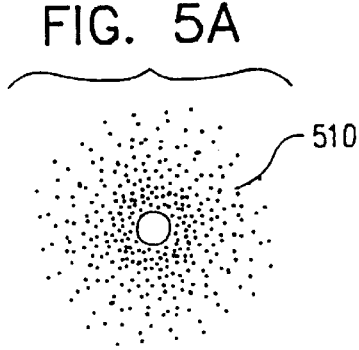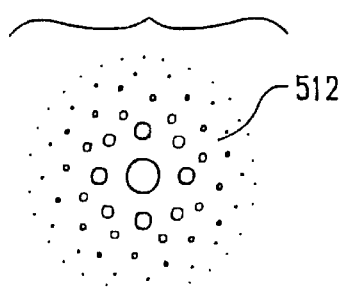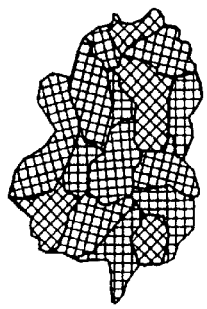

SPECKLE DEPIXELATOR

The present invention relates to an apparatus and method for filling-in the region between separated pixels of an image and, in particular, to a depixelator having a random speckle pattern.

Cross-reference is made to PCT Patent Application PCT/US94/01390 for Depixelated Visual Display of Richard Dennis Rallison, filed Feb. 7, 1994, and incorporated herein by reference.

BACKGROUND INFORMATION

Electro-optically generated displays, e.g., of the type used for virtual reality displays, video camera displays, computer displays, television displays and the like, can be generated by a number of image generators, including liquid crystal displays (LCDs), light emitting diode (LED arrays), cathode ray tubes (CRTs), plasma discharge devices, electroluminescent display, and micromirror displays. Many displays produce an image composed of a multiplicity of picture elements ("pixels"). In at least some of these devices, there is a space between adjacent pixels such that each pixels is surrounded by what is perceived by the user as a dark area. Pixelated displays in which there is a space between adjacent pixels has been found to be less satisfactory for most users than a display which has been depixelated. A process of depixelation involves filling-in the area between adjacent pixels, preferably with an intensity and/or color similar to the closest pixel.

Another problem which arises in pixelated displays is found in spatially color-distributed color displays. In this type of display, each pixel is made up of three sub-pixels, each displaying one of a set of three colors (e.g., red, green, blue), and each subpixel being separated from the others in a spatial fashion. It is desired that the user should perceive a single color at each pixel, and thus for this type of display it is desirable that depixelation among each set of subpixels should be sufficient to blend the colors together, such that, for example, if the image generator outputs substantially equally-intense red, green and blue subpixels, the viewer will perceive a single white pixel at that location.

Although the advantages of depixelation, in general, as described above, are appreciated, it has been difficult to achieve practical depixelation for a number of reasons. First, depixelation often involves blurring the pixels or the edges of the pixel. However, this must be done without losing resolution or contrast of the image to an unacceptable degree. Furthermore, some depixelation schemes are expensive or difficult to design, manufacture, repair, and/or maintain, and some depixelation schemes result in undesirable optical artifacts or side effects.

One depixelation scheme is described in U.S. Pat. No. 5,303,085 issued Apr. 12, 1994, to Rallison. Depixelation of, e.g. a liquid crystal display is provided through placement of a fiber optic base plate between the liquid crystal display and a beam splitter (a fold mirror, in this case), where the base plate has a numerical aperture related to pixel size and distance. Although this device appears to be effective for the purpose, it is desirable to also provide alternative depixelation, e.g., for purposes of supply, manufacturability, economy and the like.

Another process for depixelation with a fiber optic base plate involves placing the light source for the LCD near the rear of the pixel plane, such that the image of each pixel is enlarged, and also covers a greater portion of the total picture, correspondingly decreasing the amount of dark area surrounding each pixel. Also, the small size of each pixel causes considerable diffraction of the light which passes the edge of the pixel. Further, when a fiberoptic face plate is utilized, a diffuse source of light cannot be employed because it would create an image of each pixel on the input surface of the face plate, which would be excessively large. This forces the use of an incandescent lamp, which produces more heat which can negatively affect liquid crystal displays.

Another technique for depixelation involves positioning a weak diffuser plate a short distance from the pixel in the direction, e.g., of the bean splitter. A diffuser plate is a plate which disperses an incoming ray over a solid angle. Most diffuser plates are produced by a process of coating (e.g. painting) or mechanical (e.g. grinding or sandblasting) or chemical (e.g. etching) texturing of a surface, such as a reflecting surface or a surface of a transparent material. The diffusion produced by a weak diffuser plate is, however, in random directions, and usually of lambertian energy distribution. The weak diffuser has the disadvantage, from the point of view of a viewer, that most of the fight remains scattered and the image remains bright. These techniques do not control the modulation depth and diffractive angle well for narrow beam diffusion of small diameter input beams (such as about 20 microns).

Another approach to depixelation is using a crossed diffraction grating which is regular or periodic, typically having square or rectangular symmetry. One type of depixelator using controlled diffraction is described in PCT/US94/01390, for Depixelated Visual Display of Richard Rallison, filed on Feb. 7, 1994, and incorporated herein by reference. The depixelation effect achieved by a crossed grating can be adjusted by adjusting, e.g., the spatial frequency (inverse of the pitch) or the efficiency or modulation depth of the grating, and the material of the grating (e.g., as a volume holographic grating or as a surface grating). Crossed diffraction gratings, however (and, it is believed, all periodic depixelation structures) produce an undesirable moire pattern (also known as aliasing). The patterns may be changed or reduced by judicious use of grating frequencies and/or angles of crossing, but are difficult to reduce to the point where there is no substantial effect on viewing quality.

Accordingly, it would be useful to provide a depixelation device which is relatively inexpensive to design, manufacture, repair, and maintain, and which is substantially free from moire patterns or other undesirable artifacts or side effects.

SUMMARY OF THE INVENTION

According to the present invention, a speckle pattern diffractive optic is positioned on the optical path after the image generator (e.g., an LCD, CRT, LED, etc.). The speckle optic has a plurality of optical components such as physical or optical dimples. The angles over which light is diffracted is determined by the range and/or distribution of size and/or space between the dimples. Unlike, e.g., a grating, which has an ordered, periodic pattern, the specks, although they preferably fall within a particular range of sizes and spacings, are distributed in a random or stochastic manner with the depth of the specks preferably smoothly varying across the surface. The range of sizes and spacing of the specks and the space between the pixel plane and the depixelator are selected to achieve the desired scattering, e.g., the desired scattering angle and the desired power distribution, such as may be suited to a particular pixel pitch and/or inter-pixel spacing. The speckle optic can be produced by a number of procedures. In one procedure, the pattern is recorded in a photodeformable medium by passing a coherent light wave through a diffuser, or by reflecting the coherent fight wave from a diffuse surface. In this embodiment the configuration such as the size of the illuminated surface and the distance to the recording medium, can be selected to achieve the desired distribution or spacing of the specks. In this procedure the diffuser can be masked to provide a number of different shapes of distribution patterns for the specks.

The present invention smoothes the edges of a pixelated display by deviating the light from each pixel in a controlled but random envelope. Light is scattered through a solid angle, determined by the feature size and depth of randomly placed irregular spheroids or specks. Control of these features can be accomplished by scattering coherent light from a uniform diffuse surface, and placing recording media in positions that capture the desired speckled pattern. The depixelator can be used in a number of applications, included folded and sometimes tilted catadioptric monobiocular or stereo head-mounted display projectors focused, preferably, at a comfortable distance. Other magnifying and/or relay systems using LCD sources, such as magnified LCD sources, can also make good use of this variety of depixelator.

In another embodiment, a depixelator includes a plurality of regions, each region having a crossed-grating pattern, but with the sizes, spacing and/or orientation of the crossed-grating regions being spatially variable, preferably random.

BRIEF DESCRIPTION OF THE DRAWINGS

FIG. 3A is a schematic depiction of the action of a depixelator, according to an embodiment of the present invention;

FIG. 3B depicts light intensity at the image plane, taken along lines 3B—3B of FIG. 3A;

FIG. 3C is an enlarged schematic top plan view of a portion of a depixelator, according to one embodiment of the invention;

FIG. 4A depicts a configuration for producing a speckle optic according to one embodiment of the present invention;

FIG. 4B depicts a configuration for producing a speckle optic according to an embodiment of the present invention;

FIG. 5A depicts diffusion resulting from passing a coherent light through a speckle optic according to the present invention;

FIG. 5B depicts a pattern resulting from passing a coherent light source through crossed-gratings;

FIG. 9 depicts, schematically, a portion of a depixelator with randomly sized and oriented crossed-grating regions.

DETAILED DESCRIPTION OF THE PREFERRED EMBODIMENTS

Figure 1A:
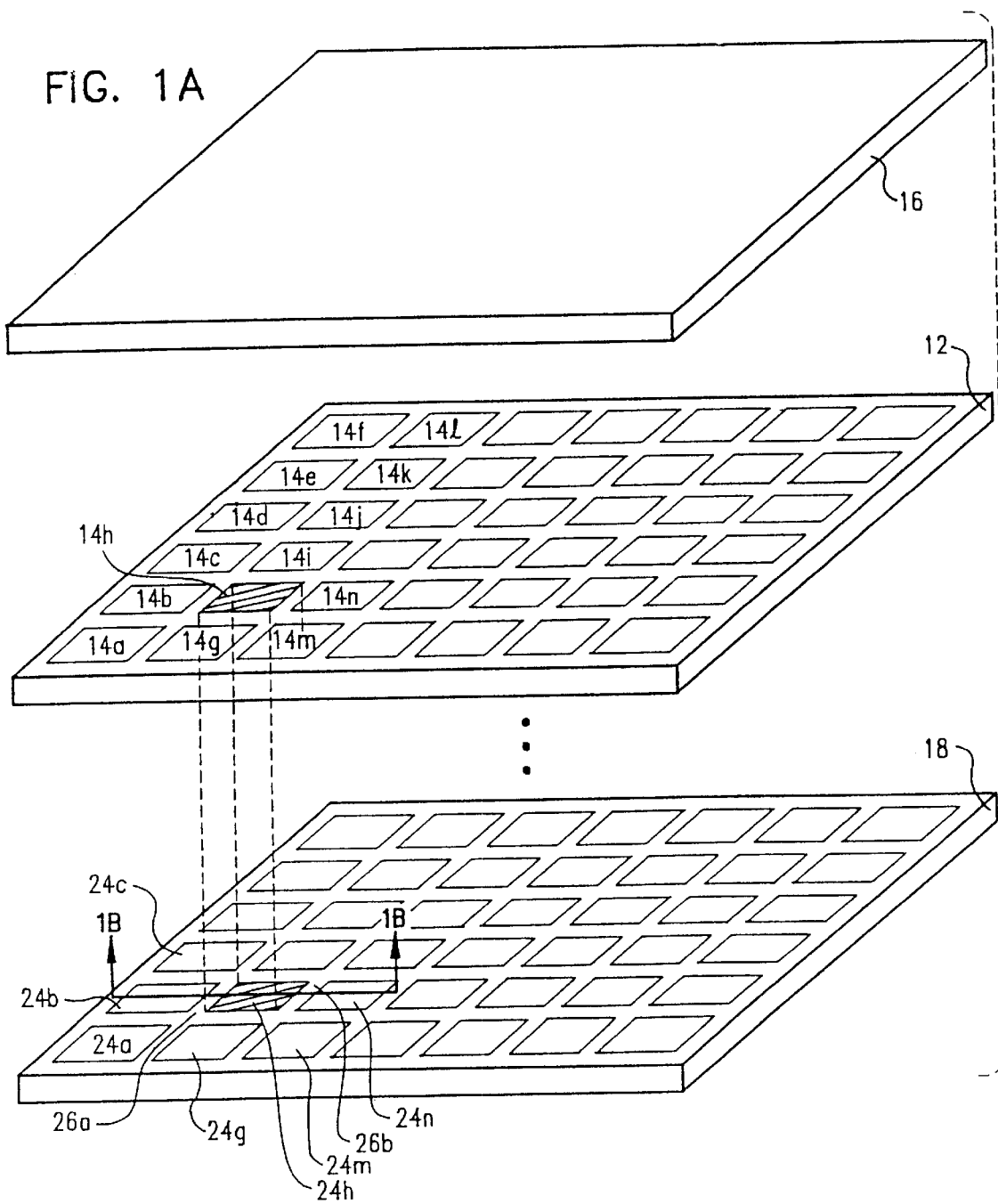
FIG. 1A depicts a pixelated display, according to previous devices.

FIG. 1 depicts, schematically, the problems that can be encountered if depixelation is not provided in connection with a pixelated display. As seen in FIG. 1A, an image generator 12 includes a plurality of pixel elements 14a through 14n, typically arranged in a rectangular array, each one of which outputs light to provide a pixel of an image, typically under the control of an image source such as a computer, VCR, video camera and the like. The image generator 12 can be any of a number of pixel devices, including LED, LCD, CRT, ELDs and plasma discharge displays. Typically, in the case of an LCD, the image generator 12 will be backlit by light source 16.

FIG. 1A depicts how the pixelated image output by the image generator 12 will appear to a viewer at the image plane 18. In the schematic depiction of FIG. 1A, it is seen that the pixels of the image generator 12 are separated from one another. At the image plane 18, this results in pixel images which are likewise separated from one another. In a typical practical device there may be other optical elements positioned along the optical path between the image generator 12 and the image plane 18, such as lenses, mirrors, holographic devices, and the like. In the device depicted schematically in FIG. 1A, i.e., in the absence of such intervening optics, the image perceived by the user, having the various pixels separated from one another, as shown in FIG. 1A, is unsatisfactory to many viewers since it presents an image to the user which is subjectively perceived as grainy or artificial.

Figure 1B:
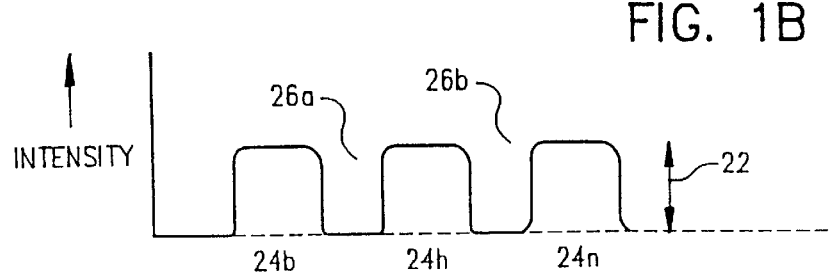
FIG. 1B depicts light intensity at the image plane along line 1B—1B of FIG. 1A.

FIG. 1B depicts, schematically, the intensity of the image brightness, along a line 1B—1B passing through three adjacent pixels 24b, 24h, 24n of the image. Assuming the pixels 14b, 14h, 14n of the image generator 12 are all outputting substantially similar intensities, the intensity at the image plane 18 will be substantially similar in value 22 in the regions 24b, 24h, 24n of the image plane 18, illuminated by the respective pixels 14b, 14h, 14n. However, the portion of the image between the pixels 26a, 26b, will have substantially no illumination, appearing to be dark or blank to the user.

Figure 2:
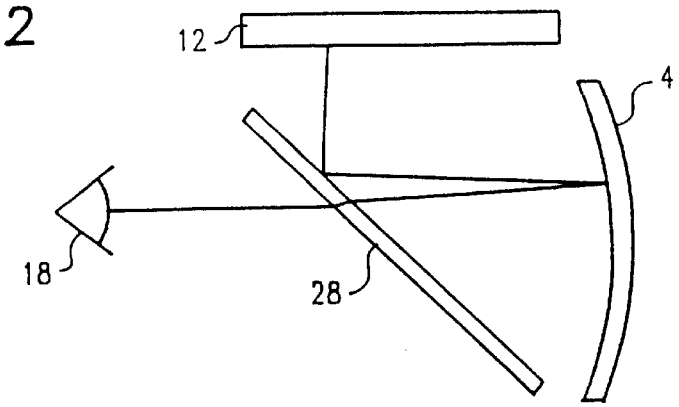
FIG. 2 depicts a folded pixelated display, according to previous devices.

This situation can be affected in a number of ways by optics that may be placed along the optical path between the image generator 12 and the image plane 18. FIG. 2 depicts, schematically, a folded display device in which the optical path between the image generator 12 and the image plane 18, as perceived by the user, includes a fold mirror 28 and a reflector-combiner 4 which may also act to enlarge the image. The device provided in FIG. 2 may be used as part of a personal display device, e.g., of the type described in PCT Applications PCT/US94/09820 for Personal Visual Display, and PCT/US94/09819 for Personal Visual Display System, both of Richard Rallison et al., filed on Aug. 31, 1994, and both incorporated herein by reference. When a magnifying element 4 is included in the optical path, the image at the image plane 18 will be larger than that at the source 12, but the pixelated appearance of the image plane will remain. Indeed, the inter-pixel dark regions 26a, 26b, etc., may also be magnified. It is found that a magnified pixelated image is often more unsatisfactory to a user than an unmagnified image.

FIG. 3A depicts, schematically, a display device which includes a depixelator 32. As depicted in FIG. 3A, the depixelator 32 receives the pixels output by the image generator 12, and provides an amount of dispersion for each pixel. Preferably, the dispersion is sufficient to provide an amount of light in regions that would otherwise be dark regions (e.g. the regions corresponding to areas 26a, 26b of FIG. 1A), so that the viewer perceives a plurality of pixels which appear to contact each other (i.e., with substantially no unlighted or dark space between adjacent pixels). FIG. 3B depicts the intensity of the light 34 along the line 3B—3B of the image plane. In the embodiment depicted in FIG. 3B, the dispersion of light from a given pixel causes light from that pixel to overlap not only the inter-pixel space but, also, to a lesser extent, the adjacent pixel and the inter-pixel space beyond that adjacent pixel. Thus, the region 36a (corresponding to what would have been a dark region 26a in the absence of depixelation) is lighted not only from the dispersive contributions 38a, 38b from the adjacent pixels 24b', 24h', respectfully, but also, to a lesser extent, from the "tail" of the dispersive profile 38c originating from the non-adjacent 24n'.

According to one embodiment of the invention, the depixelator 32 is a speckle optic which includes a plurality of optical "dimples" or specks which vary, preferably randomly, within a range, in size and/or spacing. FIG. 3C depicts, schematically, the specks in a portion of the depixelator 32. In one embodiment, the specks are depressions or dimples formed in a surface of the depixelator. In one embodiment, the dimples substantially abut one another, giving the appearance of a rough terraine with a multitude of abutting valleys or hills. In order to more clearly illustrate the configuration, each speck can be represented by its half-depth contour (i.e. the intersection of the surface of the dimple with a plane located at one-half the depth of the dimple). As can be seen in FIG. 3C, the speck half-depth contours, e.g., 42a through 42f, have a variety of sizes and spacings. The size of a speck can be characterized by its projection on a plane perpendicular to the incident light. The spacing can be characterized by the centroid-to-centroid spacing of the speck half-height contours. The particular range of sizes and/or spacing of specks affects the performance of the depixelator, as described more thoroughly below. As seen in FIG. 3C, the size distribution and/or spacing distribution of the specks are randomized or, are at least, non-periodic (as opposed to, e.g., the periodic spacing found in gratings). Each speck has a density and index of refraction which is different from that of the surrounding medium. The specks can be formed as dimples, or physical deformations, in a dielectric surface, or may be formed as "optical dimples" formed within the volume of the depixelator optic where only the density and index of refraction has changed between the specks and the surrounding medium, or the optic can have a combination of surface and volume specks. The result of a speckled depixelator of this type is to displace a portion of light from each pixel, preferably a majority of light in each pixel, a short distance away from the pixel, and is fashioned to "fill in" the space between pixels and/or, in the case of triads of colored pixels, to combine the three colored pixels into one combined-colored pixel. It has been found that the speckled depixelator, according to the present invention, can depixelate an image without creating moire patterns and without substantially degrading image resolution. Preferably, the depixelator 32 is substantially parallel to a planar image generator 12 and is positioned relatively close, such as within about 2 millimeters (depending on the application and the size and pitch of the pixels).

By controlling the pattern of specks in the speckled optic 32, it is possible to achieve a desired scattering angle and intensity distribution. It is believed that the speckled device of the present invention can achieve scattering angles and power distributions with at least the same versatility as provided by crossed-grating depixelators, but without suffering from moire patterns.

The diffracted light intensity can be adjusted by selecting the phase change induced by the speckle or, in one embodiment, by determining how deep is the quasi-spherical dimple forming each speckle.

The angle over which light is diffracted can be adjusted by selecting the size and/or space between specks in the random distribution. Preferably, the sizes and spaces are held within a range related to the space between the pixels (or pixel pitch) and the optical space between the pixel plane and the depixelator.

FIG. 4A depicts one method for forming a speckle optic. In the embodiment of FIG. 4A, a coherent light source 402 produces coherent light 404, which passes through a diffuser 406, to produce a light which is recorded in a photodeformable medium 408 such as photoresist or dichromated gelatin. The diffuser 406 can be any of a number of types of diffusers, such as, for example, ground glass or flashed opal available from Edmund Scientific. FIG. 4B depicts another method for forming a speckle optic, which is similar to the configuration depicted in 4A, except that the coherent light, rather than passing through a diffuser 406, is reflected from a diffusive surface 410. Examples of a diffusive surface which can be used for this purpose include barium oxide or aluminum oxide, available from Labsphere. The light arriving at the photodeformable medium 408 will be composed of a large number of small "specks" of light, due to the interference of light from one point on the surface with light from another point on the same surface. The pattern of specks arriving at the photodeformable medium are affected by, among other things, the size of the illuminated spot 412, and the distance 414 from the diffuser 406 or diffusive surface 410, to the photodeformable medium 408. In general, for a fixed distance, the larger the illuminated surface 412, the smaller and more plentiful are the specks. The distribution or placement of the specks or dimples is determined primarily by the size of the illuminated area on the diffuser 412 and the distance to the recording medium 414. In one embodiment, the size of the illuminated spot is about 5 mm and the distance to the recording medium is about 80 mm.

The particular speckle pattern to be used for a diffuser depends on the particular application. In one embodiment, the diameter of the illuminated area 412 divided by the distance to the film 414, is equal to the smallest speck size and/or equals the approximate angle in radians over which the light will be scattered by the depixelator. In one embodiment, the diameter of the illuminated area is about 60 mm. As noted above, the "depth" of the dimples also affects the angle over which light is scattered (e.g., by distributing light into higher diffusion orders at higher angles, as depth or modulation increases). According to one embodiment, depths are on the order of a wavelength of visible light, i.e., between about 0.5 microns and about 1.5 microns. Typical feature sizes are in a range of about 5 to 50 microns, more preferably about 10 to 40 microns, and more preferably about 20 to 30 microns. Typical inter-speck spacing is about 3 to 70 microns, perferably about 10 to 40 microns.

By varying the parameters of the configurations as depicted in FIGS. 4A and/or 4B, a variety of different speckle distributions and sizes can be provided. In one embodiment it is desired to adjust the parameters of the speckled production configuration to achieve a depixelator with a power distribution that leaves only about 10% to 40%, preferably about 20% to 35%, of the incident light undiffracted. In at least some applications this is believed sufficient to achieve the desired depixelation. Diffraction of too large a percentage of the incident light may result in light scattered over much higher angles which can lead to undesirable reduction and contrast and/or resolution. The diffracted light from such a surface is fairly evenly distributed within the solid angle of light diffraction.

In one embodiment, the diffuser 406 and/or diffusive surface 410, are shaped or masked. By such shaping or masking, it is possible to obtain almost any shaped distribution patterns desired. The exposed pattern can be regarded as a multiple of seff-referenced or local-referenced holograms that will reconstruct with significant smoothing or blurring of the reconstructed images. Shaping or masking can include shapes such as circular, oval, scalloped, bi-nodal (dumbbell), toric (doughnut), rectangular, or geometric zone plate.

In general, the speckled pattern depicted in FIG. 3C will have a highest or maximum spatial frequency which will define the outer angular limits of the scattered light, but will also contain a random distribution of lower spatial frequencies that serve to "fill-in" the solid highest angle with uniform illumination. Thus, it is possible to provide an operable speckle optic by performing design calculations only for the highest angle or spatial frequency. The calculated highest angle is not necessarily the highest angle found in the device because increasing modulation produces increasing angular deflection. Optimal exposure and processing or fabrication procedures can be determined empirically for a given application.

A speckle optic, according to the present invention, can be used to provide depixelation which is based on randomized diffraction, as opposed to ordered or periodic diffraction from, e.g., a crossed-grating depixelator, which is believed to contribute to the reduction or elimination of moire patterns. This effect is illustrated in FIG. 5A, which shows the pattern of diffraction produced when a coherent light source is transmitted through the speckle optic of the present invention. The random pattern 510 of diffraction depicted in 5A is in contrast to the ordered or periodic diffraction pattern 512 characteristic of transmission of coherent light through crossed-gratings.

Figure 6:
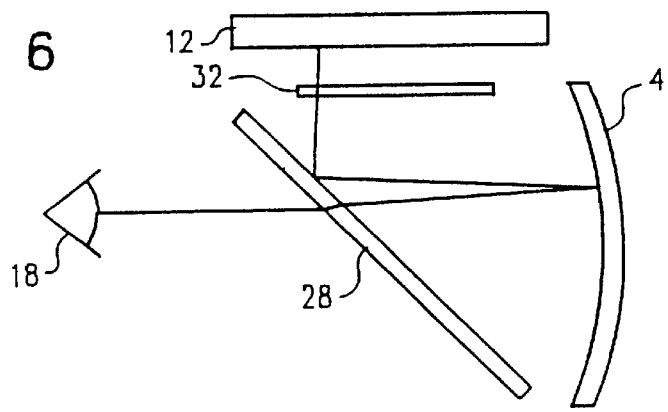
FIG. 6 depicts a folded optical path device, including a depixelator, according to an embodiment of the present invention.

FIG. 6 depicts one configuration for implementing a depixelator according to the present invention, in a folded display system such as a personal or virtual reality display system. In the embodiment of FIG. 6, the depixelator 32 is positioned between the image generator 12 and a fold mirror 28. In this embodiment, the depixelator 32 is located parallel to the pixel plane of the image generator 12 to receive, diffract and transmit and thereby depixelate, the image light from the image generator. The fold mirror 28 receives the depixelated image light and reflects it to a reflective combiner, which reflects the depixelated image light, possibly combined with light transmitted through the reflective combiner 4, e.g., from the surrounding environment, transmitting the combined environmental light rays and depixelated image light through the fold mirror 28, to the image plane 18, such as the eye position of the user.

In one embodiment, the spatial frequency range of the speckle optic is such that the highest spatial frequency (or inverse of the smallest speck or dimple), multiplied by the shortest wavelength of the image light, is approximately equal to the center-to-center distance between adjacent pixels in the pixel plane of the image generator, divided by one to two times the optical distance between the depixelator and the pixel plane of the image generator.

Figure 7:
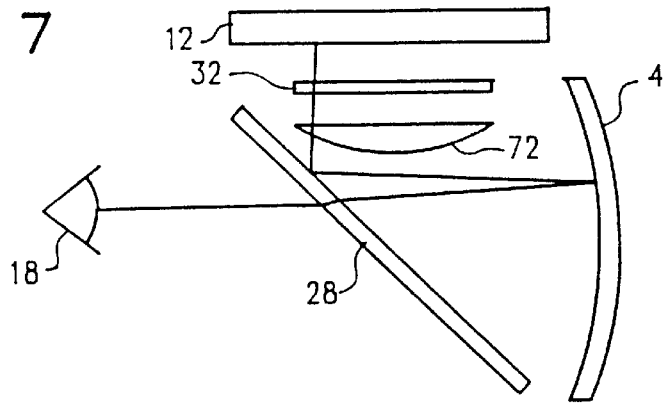
FIG. 7 depicts a folded optical path device, including a depixelator, according to an embodiment of the present invention.

FIG. 7 depicts another embodiment which is similar to the embodiment of FIG. 6, except for the introduction of a correction lens 72 between the depixelator 32 and the fold mirror 28. In this embodiment, the flat surface of the lens 72 is oriented toward the pixel plane of the image generator 12. The lens 72 is provided for optically correcting the depixelated image light.

Figure 8:
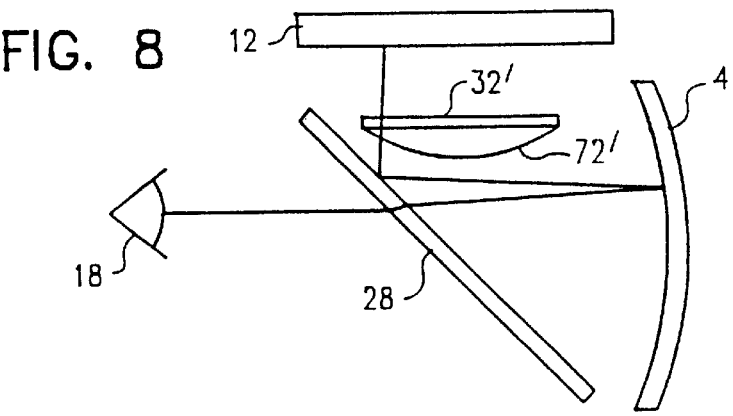
FIG. 8 depicts a folded optic path device, including a depixelator according to an embodiment of the present invention.

In the embodiment depicted in FIG. 8, the speckle optic 32' is attached to the flat surface of the correction lens 72'.

It is preferred that the modulation depth of the speckle optic 32 should fall within the range of greater than 50%, preferably 60% to 70%, and that the depixelator be smoothly varying from dimple to dimple.

FIG. 9 depicts another embodiment of the present invention. In this embodiment, the depixelator 912 is made-up of a number of regions, 914a–914p. Each region has a crossed grating pattern. However, the orientation of the crossed gratings and/or the sizes and/or shapes of the regions are different from one region to the next. Preferably the orientations, sizes and/or shapes are non-periodic, preferably randomized. In one embodiment the maximum region size is no more than about twice the pixel size.

In light of the above description, a number of advantages of the present invention can be seen. The present invention provides for depixelation of a pixelated image while substantially retaining image contrast and resolution, and without introducing moire patterns or other undesirable artifacts or side effects. The depixelator can be provided in a fashion which is relatively easy and inexpensive to design, manufacture, repair and/or maintain. Because of the small size of the specks and/or the random configuration, there is little or no need to align the depixelator with individual pixel elements of the image generator, thus easing the task of constructing practical display devices.

It is believed that the present invention can be used, among other applications, at least whenever the angles attended by a pixel in a magnified view exceeds about 2 minutes of arc, or, e.g., when pixels are easily seen as artifacts in the scene.

A number of variations and modifications of the present invention can be used. Although the specks are described as being random in size and distribution (within a range), the specks can be provided in non-periodic fashions which are not strictly random. In some embodiments the speckle pattern may be repeated on a large scale, but non-periodic on the scale of about the size of one or two pixels. Although the speckle pattern can be produced in the fashion described and, e.g., as depicted in FIGS. 4A and 4B, a speckle pattern can also be generated, e.g., by a computer random-pattern generation method, or with fiber optic bundles. In addition to forming a speckle pattern in a photodeformable medium, a speckle optic can be formed by creating a photopolymer or photoresist negative and growing a positive metal, e.g. Nickel, image on the surface. In another embodiment, a master speckle pattern can be used for photoetching copies, including photo-assisted chemical etching.

Although the present invention has been described by way of a preferred embodiment and certain variations and modifications, other variations and modifications can also be used. The invention being defined by the following claims:

What is claimed is:

1. A display device comprising:
   an image generator outputting light in discrete pixels, at least some of said pixels spaced from adjacent pixels to define non-pixel regions;
   a depixelator which receives said light output by said image generator and at least partially disperses said light to provide image light in said non-pixel regions, said depixelator having a plurality of non-periodically positioned dispersive elements.

2. A display apparatus, as claimed in claim 1, wherein said dispersive elements of said depixelator comprise a plurality of specks, each speck having an index of refraction different from that of adjacent regions of said depixelator.

3. A display apparatus, as claimed in claim 2, wherein said specks include specks formed in the volume of said depixelator.

4. A display apparatus, as claimed in claim 2, wherein said specks include specks formed as dimples on a surface of said depixelator.

5. A display apparatus, as claimed in claim 4, wherein said dimples have an effective depth between about 0.5 microns and about 1.5 microns.

6. A display apparatus, as claimed in claim 2, wherein said specks have an inter-speck spacings within a predefined spacing range.

7. A display apparatus, as claimed in claim 6, wherein said inter-speck spacing is substantially random, within said spacing range.

8. A display apparatus, as claimed in claim 2, wherein said specks have speck sizes in a size range such that the effective cross-sectional area of the projection of a speck on a plane perpendicular to the optical path from said image generator to said depixelator is within a predefined size range.

9. A display apparatus, as claimed in claim 8, wherein said size range provides a power distribution that leaves between about 10% and about 40% of the incident pixel light undiffracted.

10. A display apparatus, as claimed in claim 9, wherein said size range is between about 5 microns and about 50 microns.

11. A display apparatus, as claimed in claim 9, wherein said speck sizes are substantially random, within said size range.

12. A display apparatus, as claimed in claim 1, wherein said dispersive elements comprise a plurality of regions, each of which contains a periodic pattern.

13. A display apparatus, as claimed in claim 1, wherein said dispersive elements comprise a plurality of crossed-grating regions.

14. A display apparatus, as claimed in claim 13, wherein said plurality of crossed-grating regions are randomly oriented.

15. A display apparatus, as claimed in claim 1, wherein said depixelator is positioned within about 2 millimeters of said image generator.

16. A display apparatus, as claimed in claim 1, wherein said image generator is selected from the group consisting of a CRT, an LCD, an LED array, an electroluminescent device and a micromirror device.

17. A display device as claimed in claim 1, wherein said image light provided in said non-pixel regions includes image light originating from non-adjacent pixels.

\* \* \* \* \*